Aug. 6, 1968  J. C. TAYLOR  3,395,615
SERVO MONITORING CONTROL APPARATUS
Filed March 18, 1963  6 Sheets-Sheet 1

FIG. 1

INVENTOR.
JOHN C. TAYLOR
BY
ATTORNEY

FIG. 2

INVENTOR.
JOHN C. TAYLOR
BY
Gordon C Reed
ATTORNEY

United States Patent Office 3,395,615
Patented Aug. 6, 1968

3,395,615
SERVO MONITORING CONTROL APPARATUS
John C. Taylor, Golden Valley, Minn., assignor to Honeywell Inc., a corporation of Delaware
Filed Mar. 18, 1963, Ser. No. 265,795
19 Claims. (Cl. 91—363)

This invention relates to control apparatus and pertains more particularly to methods and means for increasing the reliability of operation of control apparatus. For the purpose of illustration, the invention has been applied to a control apparatus concerned with the yaw of an aircraft, but it is to be noted that such control apparatus is equally applicable to other axes such as the roll or pitch axes of dirigible craft such as an aircraft.

The invention as stated is concerned with obtaining an increase in reliability in operation of control apparatus and herein is obtained by redundancy methods. It is thus generally similar to a prior U.S. patent application of Carson, Derr, and Iverson Ser. No. 170,695, filed Feb. 2, 1962 assigned to the same assignee as this application. In the prior aforesaid Carson et al. application, both signal source or signal bridge monitoring and servomotor operation monitoring were provided to increase reliability. In the present application signal source monitoring or bridge monitoring along with servo operation monitoring but of a different type is also provided. In the prior arrangement by means of a monitor, upon the ascertainment of a discrepancy in one signal among a plurality of signals derived from a plurality of channels, a servomotor was rendered ineffective to operate its control surface.

An improvement herein over the prior arrangement and thus an object of the invention is in comparing the signals from a plurality of signal sources or channels, and upon the presence of a discrepancy in one signal among the plurality of signals, rendering such signal source ineffective but not rendering the servomotor ordinarily controlled thereby ineffective.

A further object of this invention involved with increasing reliability by redundancy methods is to monitor the signals from a plurality of signal sources each operating a common servomotor and rendering one such signal source ineffective upon discrepancy of its signal among a plurality of signals and increasing the gain of the remaining signal sources retained to substantially obtain the same servomotor operation as with all signal sources being effective.

While the above statement may be viewed as a single signal failure source and single motor operation, a further object of this invention is to utilize a plurality of servomotors with means for increasing the gain of the remaining signal sources following the determination of a discrepancy in one source of signal.

A further object of this invention is to compare the operation of two servomotors controlled by the same signal and rendering them ineffective if their operations are dissimilar.

A further object of this invention is to provide two pairs of servomotors, all controlled by the same signal and doubling the gain effect of said signal on one pair when there is a dissimilarity in operation of the other of said two pairs of servomotors.

A further object of this invention is to provide for alternative manual operation of the output member of a plurality of servomotors following the occurrence of a double signal failure, that is, a discrepancy in two different signal sources, which actuates means that renders ineffective the plurality of servomotors on said output member.

A further object of the invention is to increase the capability of the control apparatus to withstand component tolerance accumulation when comparing one channel with another.

The above and further objects of the invention will be evident upon review of the following specification and claims in conjunction with the accompanying drawings disclosing one embodiment of the invention.

The invention is involved with increasing reliability by the use of redundant methods, and the redundant method utilized is of the parallel type. In one aspect of the invention, a plurality of simultaneously operable signal channels jointly control the operation of servomotors to position an output member. Each channel constitutes a source of control signal also termed a signal bridge, and in order to determine the malfunction in any signal source, monitoring of all such signal sources is provided.

In another aspect of the invention, the servomotors are paired and each servomotor is arranged in an individual followup system. The extent of operation of a pair of motors is compared by a servo operation monitoring means termed servo monitor in order to eliminate any pair of servomotors having a malfunctioning servomotor.

While a single signal source failure merely results in eliminating the particular malfunctioning source of signal to control the servomotors, yet upon the presence of a double signal source failure, the signal monitoring means termed bridge monitor is effective to eliminate the particular faulty signal sources and also to render all servomotors ineffective to position an output member.

Figure 1:
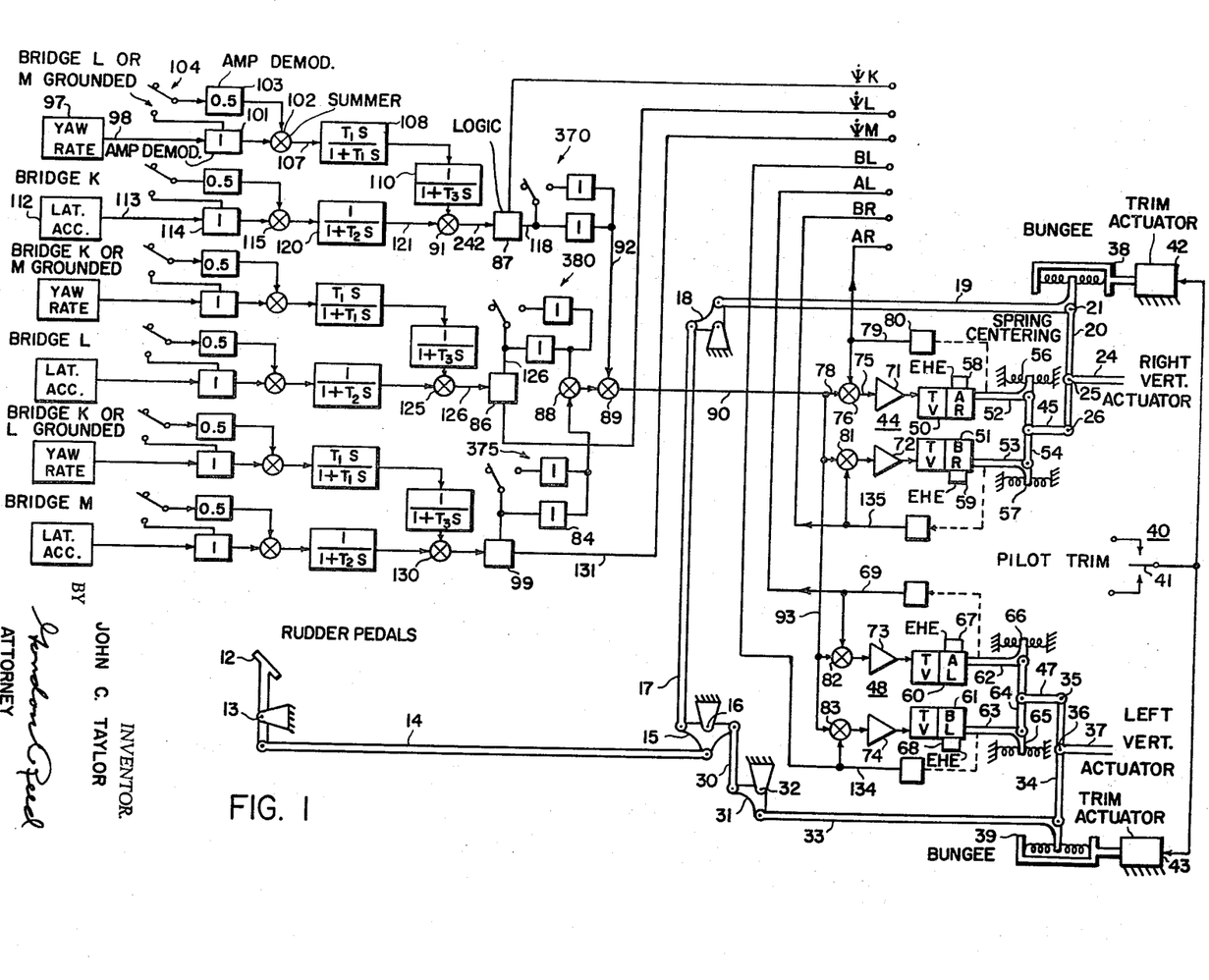
FIGURE 1 is a modification of Figure 1 of the prior Carson et al. application, such modification showing in block form a plurality of sources of control signals jointly operating each of a plurality of servomotors.

Referring to FIGURE 1, which is similar to the arrangement in the Carson et al. application, a rudder pedal 12 on a aircraft and which is pivoted at 13 operates through a connecting link 14, a three armed lever 15. Operation of lever 15 is transmitted through link 17, bell crank lever 18, link 19, differential lever 20 pivoted at 26 to position an output member 24 pivoted thereon. The output member 24 serves to control the operation of a right vertical actuator (not shown) connected to a rudder surface of an aircraft.

Also as in the aforesaid Carson et al. application, operation of three armed lever 15 is also transmitted through a link 30, bell crank lever 31, pivoted at 32, link 33, differential lever 34 pivoted at 35, link 37 connected at an intermediate point 36 thereof to control the operation of a left vertical actuator (not shown), for the left rudder surface of an aircraft.

The operation of link 19 above is opposed by a bungee apparatus 38 on the aircraft; and similarly the operation of link 33 is resisted by a second bungee arrangement 39 on the craft.

By means of a motor controlled switching arrangement 40 having a pilot trim motor control operable arm 41, a trim actuator motor 42 and a trim actuator motor 43 may be operated to alter the normal biasing point of links 19 and 33 respectively thereby changing the normal position of rudder pedal 12.

Connected to pivot 26 of lever 20 is an output link 45 of a first series servo arrangement 44, and extending to pivot 35 of differential lever 34 is a link 47 from a second differential or series servo arrangement 48. The term "differential" or "series" implies that the operation of links 45 or 47 is not reflected back as to cause movement of rudder pedal 12. In other words the bungee arrangements 38, 39 of themselves prevent the feedback of operation of links 45 and 47 to position rudder pedal 12.

The first differential servomotor arrangement 44 comprises a first hydraulic type or fluid servomotor 50 with a conventional transfer valve (TV) and a second hydraulic servomotor 51 with a transfer valve (TV). The servomotors have their respective power sections (AR, BR) operating output members 52, 53 connected to opposed ends of a link 54 which in turn has its midpoint connected to link 45. The power section of servomotor 50 includes a piston (not shown) which when not operative or ineffective is biased to normally centered position through an internal spring centering arrangement illustrated for simplification here as an exterior centering arrangement 56. Similarly the servomotor 51 also when rendered ineffective for operation by the fluid pressure source includes a piston which is biased to a normal centered position and locked therein by an internal spring arrangement represented herein by arrangement 57.

The second differential servomotor arrangement 48 similarly comprises a fluid type servomotor section 60, a fluid type servomotor section 61 with the fluid operated servomotors having their respective power output members 62, 63 connected to opposed ends of a link 64 having an intermediate point thereof connected to link 47. Servomotors 60, 61 similarly to motors 50, 51 have respective centering means 66, 65 for centering and locking the power pistons in servomotor sections (AL, BL) upon such servomotor being rendered ineffective for operation as will be clarified hereinafter.

Each of the four servomotors has its piston centering means selectively disabled and the servomotor is effective for subsequent control operation from sources of control signals. This rendering the servomotors ineffective is controlled by an electrohydraulic engage valve (EHE) upon energization thereof. Thus servomotor 50 has an engage valve 58, motor 51 has an engage valve 59, motor 60 has an engage valve 67, and motor 61 has an engage valve 68. When the servomotors are thus rendered effective for operation, such operation is controlled by their respective amplifiers 71, 72, 73 and 74.

The general type of fluid servomotors, the means for rendering each servomotor effective and the means such as transfere valves (TV) for subsequently controlling operation of such servomotor when rendered effective as thus far described are old in the art and may be of the type disclosed in Figure 3 of the patent to Rasmussen 3,034,483. The aforesaid electrohydraulic engage valve corresponds with means including the electric solenoid 111 in Figure 3 of Rasmussen. Thus energization of solenoid 111 of the patent opens the valve 346 causing pressure fluid to be supplied through lines 340, line 347, line 367, to the ram of piston centering means 361 thus rendering it ineffective to center the piston. It is to be understood that the piston or ram 144 of the patent would operate for example member 52, FIGURE 1 herein with the base 110 of the servomotor of the patent fixed to the craft.

Returning to control of the power pistons by their amplifiers, amplifier 71 receives a resultant AC voltage control signal from conductor 75 extending from a suitable AC and DC signal summing device 76. Device 76 provides a resultant signal obtained from a DC voltage control signal on conductor 78, representing responses of the craft to changes while in flight and a second or AC servo displacement signal on transmitting means 79 received through a signal providing device 80 operated from displacement of the output member 52 of servomotor 50. Such followup signal as obtained on transmitting means 79 is old in the rebalance means 380 of the servomotor in Figure 3 of Rasmussen above. Summer 76 for example may include a chopper that converts the DC signal to AC which is summed with the AC feedback signal.

It will be noted that the same input signal supplied by conductor 78 to summing device 76 is also supplied via conductor 93 to summing device 82 similar to summer 76. Thus there is a pair of servomotors, as 50 and 60 or (AR, BR), one of which is in each differential arrangement 44, 48 controlled by the same input control signal. Likewise the signal on conductor 93 is supplied to summers 81, 83 that control amplifiers 72, 74 of servomotors 51, 61.

The DC signal on input conductor 78 corresponds with the sum of a plurality of similar signals derived from the response of the craft to various flight conditions. The signal is supplied thereto through conductor 90. One of a plurality of signals on conductor 90 is supplied from intermediate summing device 89, conductor 92, gain changing device 370, logic and magnetic modulator means 87, from a summing device 91. The purpose of means 87 is to transmit a K signal bridge servo control signal and to also supply such signal to a bridge monitor as will be evident later.

Summing device 91 supplies a composite rate and acceleration output signal from a channel K of the yaw stability augmenter apparatus. Channel K comprises a yaw rate sensing device 97, such as a conventional yaw rate responsive gyroscope which provides on conductor 98 an alternating signal voltage of a magnitude dependent upon the rate of yaw of the craft and of a phase depending upon the direction of yaw of the craft. The AC voltage signal on conductor 98 is supplied to an amplifier-demodulator 101. The AC input is thereby converted to a DC output and supplied to a voltage signal summing device 102. Summing device 102 under circumstances to be described and for gain changing purposes represented broadly additionally receives the output of amplifier-demodulator 101 which is connected thereto at times through switching arrangement 104.

The arrangement of the amplifier-demodulator 101 in parallel with the switching arrangement 104 alters the gain of the amplifier-demodulator by a three halves change in gain upon disengagement of either of two other signal channels, to be described. While this is one means of changing gain, the preferred means will be described in connection with FIGURE 3.

The output from summer device 102 is supplied through a high pass network 108 which blocks steady state control signals. The output from network 108 is supplied in turn to an aeroelastic filter 110 represented as a lag device which is a notch filter that avoids exciting the body bending modes of the craft and the output from the aeroelastic filter is supplied to summing device 91.

Signal channel or signal bridge K also includes an accelerometer 112 sensing all craft lateral accelerations. Accelerometer 112 derives an AC voltage signal of a magnitude in accordance with the magnitude of the lateral accelerations of the craft and of a phase depending upon the direction of acceleration. The output from lateral accelerometer 112 is transmitted through conductor 113 to amplifier-demodulator 114 having its DC output supplied to summing device 115 which in turn through passive lag device 120 and conductor 121 supplies the other input to summing device 91. The output of the device 91 is a composite signal identified as $\psi K$, which is fed to logic device 87.

The yaw stability augmenter system additionally includes as a source of another of the similar control signals a signal channel L similar to channel K having a yaw rate sensor and a lateral accelerometer sensor similar to those units in channel K and having the elements forming such yaw rate sensor and lateral accelerometer corresponding to the arrangement in channel K so that the control signals are supplied to summing device 125. The composite signal $\psi$L from device 125 is transmitted through conductor 126, through logic device 86, and a gain device 380 to a signal summing arrangement 88. The output from summer 88 is supplied to summer 89.

The yaw stability augmenter additionally includes as a third source of a similar control signal a signal source or channel M having a yaw rate sensor and lateral accelerometer sensor similar to that in channel K and having the elements following such sensors corresponding to those in channel K. Thus the aircraft flight condition signals, namely rate and acceleration, are supplied to a summing device 130 which has its output connected through conductor 131, logic device 99, gain device 84, to summing device 88.

It will thus be evident that there is a combining of the signals from signal providing channels K, L and M so that the resultant DC signal from every channel by means of summing devices 88, 89 and the output conductor 90 from summer device 89 is supplied to each servoamplifier 71, 72, 73 and 74. Thus each resultant control signal from either of the channels K, L, M controls operation of all of the servomotors 50, 51, 60, 61.

As thus far described, the apparatus provides a yaw stability augmentation system for an aircraft wherein the system includes three signal sources K, L and M all of which normally provide a similar output signal and all of which output signals control four servomotors. These four servomotors are grouped in pairs (AR, AL) and (BR, BL) and each pair jointly controls the position of a vertical control surface such as a rudder of an aircraft through a main actuator.

While providing the three sources of control signals in parallel to all of the servomotors may increase reliability, should one signal source fail it is desired to render ineffective any malfuctioning source of control signal. For this purpose a bridge monitoring arrangement which will now be described has been provided. Additionally, since it is desirable to render ineffective a malfunctioning pair of servomotors, a servo monitor has also been provided. The monitoring features shown broadly in FIGURE 2 will now be considered.

Figure 2:
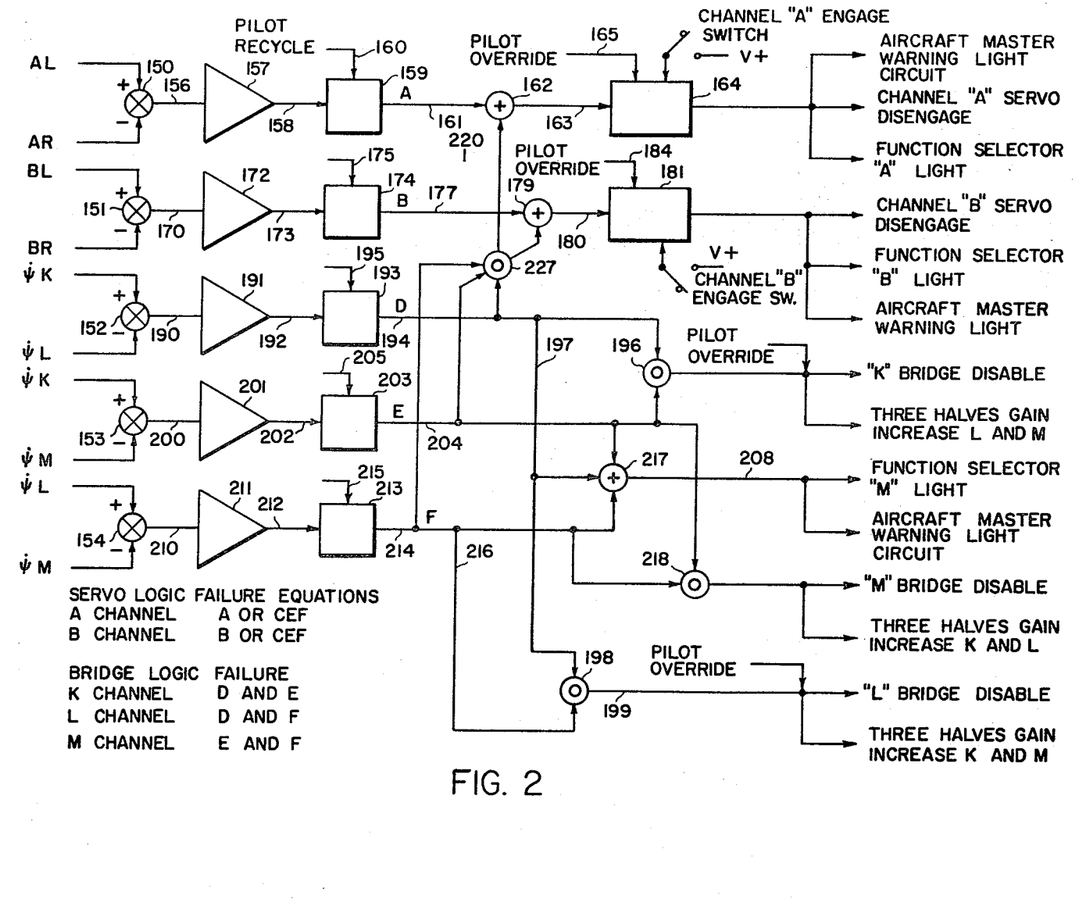
FIGURE 2 is a block diagram of a logic arrangement for monitoring the signals from the plurality of signal sources and for monitoring the relative operation of a plurality of servomotors.

The output as stated from summing device 91 through device 87 is referred to in FIGURE 2 as ($\psi$K); the output from summing device 125 is referred to as ($\psi$L); and the output from summing device 130 is referred to as ($\psi$M). These outputs are all a function of yaw rate, $\psi$.

The following is not concerned directly with the bridge monitor or signal source monitor and is basically concerned with the servo monitor. It is interjected here since monitoring is based on comparison of signals and because we are discussing sources of control signals that are to be monitored herein as shown in FIGURE 2. It will be noted the displacement of servomotor 50 as represented from the AC servo displacement followup signal on conductor 79, represented in FIGURE 2 upper left as (AR) should be the same as the AC electrical signal derived from operation of servomotor 60 appearing on servo displacement followup conductor 69 and represented as (AL). Equality in the displacements of the two servomotors is expected since the two servomotors 50, 60 receive a like control signal from the output of summing device 89. Also, the AC electrical followup signal (BL) on servo followup conductor 134 of servomotor 61 should be the same as the AC electrical signal (BR) on followup conductor 135 of servomotor 51.

The above seven electrical signals $\psi$K, $\psi$L, $\psi$M, BL, AL, BR, AR, are used in a bridge monitor and servo monitor shown in block form in FIGURE 2. However, before leaving FIGURE 1, and for relating the function of the bridge monitoring means thereto, means are included in FIGURE 1 for broadly increasing the gain of any of two remaining signal bridge networks K, L, M, while rendering the third ineffective so that substantially similar operation is applied to the four servomotors AR, AL, BL, BR upon a single bridge failure as would occur if no bridge malfunction was present. As to the servo monitor, FIGURE 1 includes broadly an arrangement for doubling the gain of a left and a right servomotor of one pair of servomotors upon the existence of a malfunction between one left and one right servomotor of the other pair (AR, AL) or (BR, BL).

In FIGURE 2 which is a block diagram of the servo monitoring and the bridge monitoring arrangements there are five summing devices 150, 151, 152, 153, and 154. Summing device 150 receives servo displacement signal AL from servomotor 60 and AR from servomotor 50. The output from summing device 150, if any, is applied through conductor 156 to buffer amplifier 157, which may be a two stage transistor amplifier. Ordinarily the two opposed signals AL and AR are equal, and thus no input control signal or error signal is applied on conductor 156. The output from amplifier 157 is applied over conductor 158 to a bistable device 159 here called a memory circuit which may be a flip-flop type of device or silicon controlled rectifier. The function of device 159 is to maintain an output on its output means 161 upon any input signal to amplifier 157 despite any subsequent agreement between signals AL and AR. Device 159 includes a pilot recycle means 160.

*Servo monitor*

The output on output means 161 is applied to an OR gate 162 represented by the symbol $\oplus$ and thence through transmission means 163 to a power switch 164 which on receipt of a signal over transmission means 163 renders the two servomotors 50 and 60, FIGURE 1, ineffective to operate their output members 52, 62 as will be described more fully hereinafter. In addition to rendering the two servomotors AR, AL ineffective, various indicating means such as an aircraft master warning light circuit may be closed as would also a function selector light circuit related to the disengaged servomotors and conveying this information to the pilot.

Similarly the summing device 151 has applied thereto displacement signals from servomotors 51 and 61. Again if there be no mutual cancellation effect or a difference or error signal, the difference is applied over a conductor 170, buffer amplifier 172, conductor 173, memory 174, transmission means 177 to an OR gate 179, indicated $\oplus$, and thence through conductor 180 to a power switch 181 which on receipt of a signal renders the two servomotors 51, 61 ineffective to operate their respective output members 53, 63 and thus right and left vertical actuators that control the two rudder surfaces of the aircraft. Additionally circuits to energize indicating lights such as an aircraft master warning light are completed as is also a circuit for a light on a function selector associated with the servomotors 51, 61.

*Bridge monitor*

Leaving the servo monitor for the time being and progressing to the bridge monitor or signal source monitor, summing device 152 has applied thereto a K channel composite control signal $\psi$K and an L channel composite control signal $\psi$L from the respective magnetic modulators in these respective channels. Any difference in these signals when algebraically summed is applied over conductor 190 to amplifier 191. The output from amplifier 191 is supplied by conductor 192 to the bistable or memory device 193, having its output in turn supplied through conductor 194 to an AND type switching logic device 196, represented by the symbol $\odot$. The switching logic device 196 functions to disable the K signal channel bridge network or signal voltage source upon malfunction thereof and also serves to increase the gain of the L and M signal channels each by three halves, as will be described more fully hereinafter.

Since the logic device 196 is of the AND type, it will only supply an output therefrom when a second input is supplied concurrently thereto. The second input is derived from summing device 153 which receives the K channel signal and the M channel signal from the respective magnetic modulators in these channels. Any difference between these two signals is applied over conductor 200, amplifier 201, conductor 202, memory 203, conductor 204, to the switching logic 196.

In the similar manner that the AND gate switching logic 196 controls the disablement of the K bridge or K channel signal source, a second AND gate or switching logic 198 serves to disable the L channel signal source upon malfunction thereof and also increases by three halves the gain of signal sources K and M. Also, AND gate or switching logic 218 functions to disable the M channel signal source upon malfunction thereof and also increases by three halves the gain of channels K and L as will be more fully described hereinafter. The AND gate 198 receives inputs from conductor 197 extending from the output conductor 194 of memory 193 and a second input from conductor 216 extending from the output conductor 214 of memory 213. The AND gate or switching logic 218 receives one input from conductor 204 serving as the output of memory 203 and a second input from the output conductor 214 of memory 213.

The signal bridge monitor includes an OR gate switching logic 217 which receives three inputs: a first from the output conductors 194, 197 of memory 193, a second from the output conductor 204 of memory 203, and a third from conductor 214 which is the output of memory 213. This OR switching logic 217 controls an indicator light on the function selector to indicate a M bridge or signal source malfunction and also energizes the aircraft master warning light circuit.

It will be evident thus far with respect to the signal bridge monitor that having an output from summing device 152 on conductor 190 is not sufficient to determine whether the K signal channel or the L signal channel will be rendered ineffective. Whether the K signal channel will be rendered ineffective depends concurrently on a difference between the K channel bridge signal and the M chanel bridge signal determined by summing device 153. Only in the event that there is a concurrent output from both summing devices 152 and 153 to switching logic 196 will the K signal channel be rendered ineffective and the gain of channels L and M increased. In a similar manner, the AND switching logics 198, 218 determine whether the L channel signal source will be disabled or the M channel signal source be disabled.

*Bridge failure—servo disengage*

As thus far considered, the bridge signal monitor has been concerned merely with a single bridge or signal source malfunction or single bridge failure. In the event that a double bridge failure occurs, such as a concurrent failure in channels K, L, it is desired that not only will the signal sources K, L, M be rendered ineffective or disabled but that the four servomotors AR, AL, BR, BL will be rendered ineffective. This servo disengage function is supplied by a cross connection between the bridge monitor or signal source monitor and the servo monitor. This cross connection is effected through the AND gate type switching logic 227 having its output connected in one case to OR gate 162 and also to OR gate 179 in the servo monitor. The AND gate 227 receives inputs from the output members 194, 204, 214 of memories 193, 203, 213. Thus upon a double bridge failure such as malfunctioning in both channels K and L, for example, even if channel M not be malfuctioning, there will be outputs from the three memory devices 193, 203, and 213 to supply a concurrent input to AND device 227 to disengage the four servomotors 50, 51, 60, 61 rendering them ineffective to operate the right and left rudder actuators.

It is to be noted in connection with FIGURE 2 that the bistable or memory devices all have pilot recycle controls to restore the initial condition of these bistable devices. Also the two power switches 164, 181 are provided with manual or pilot override controls 165, 184 to permit the pilot of the aircraft to override the switching logic and maintain the servomotors 56, 60, or 51, 61 operative to override any control supplied to the power switches from conductors 163 or 180.

*Monitor logic*

Summarizing the monitoring arrangement, the logic failure equations pertaining to FIGURE 2 may be stated thus, assuming that the primed letters A', B', D', E' and F' indicate the normal state or balanced state: (1) A servo failure equals $A+(DEF)$: wherein the plus sign (+) is interpreted in the logic switching as OR thus going from A' to A or going simultaneously from D' & E' & F' to D & E & F; B servo failure equals $B+(D \& E \& F)$. With respect to the bridge logic failure: (1) K signal channel failure equals D & E; (2) L signal channel failure equals D & F; (3) M signal channel failure equals E & F. In other words for rendering the K channel bridge ineffective there must be a simultaneous or concurrent output from D and E to AND gate 196. Similarly for disabling the L channel or L bridge signal source there must be a simultaneous output on D and F to AND gate 198; and to disable the M channel signal source requires a simultaneous output from E and F to AND gate 218.

Reference is now made to the remaining figures of the drawing showing mechanical details of components of FIGURES 1 and 2 more directly involved in the bridge monitoring and servo monitoring arrangements. While FIGURES 1 and 2 may show some of the components separated, some of them may be combined in the remaining figures.

Figure 3:
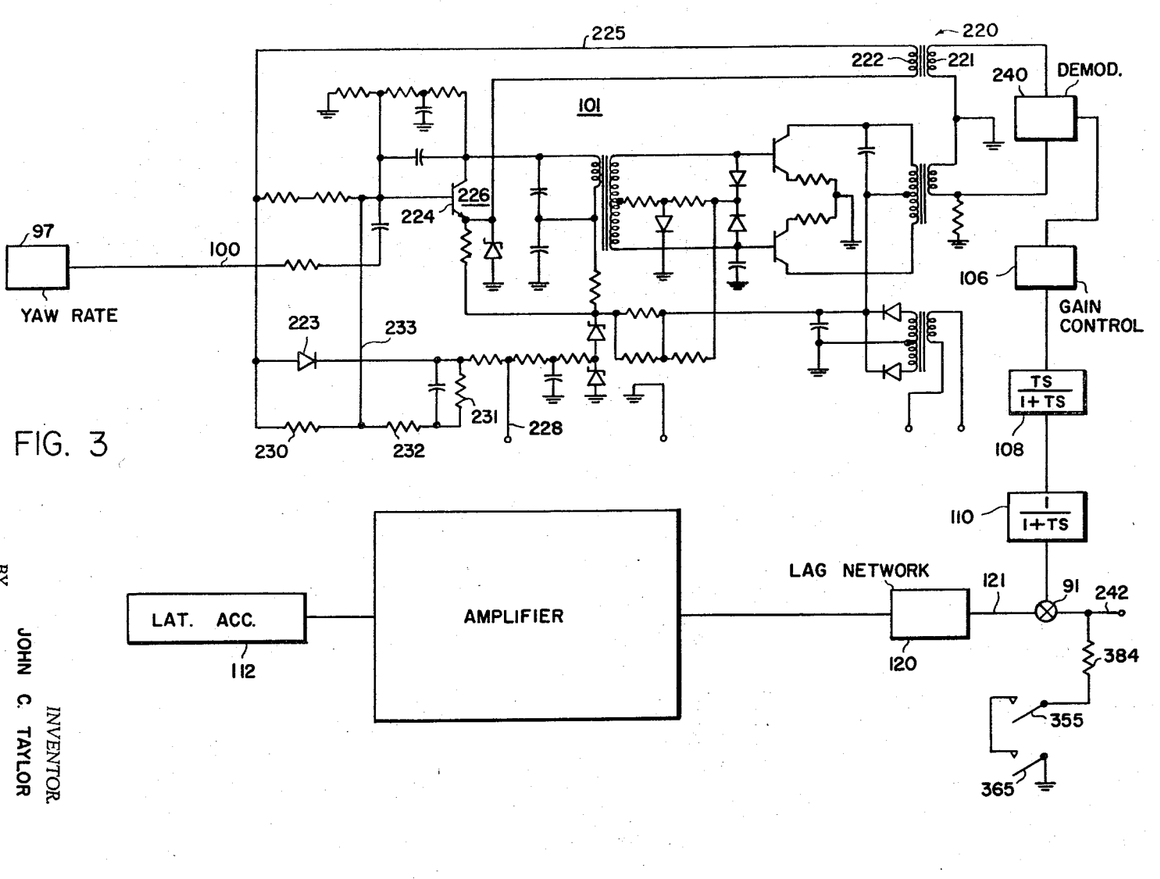
FIGURE 3 is an electrical schematic of a portion of FIGURE 1 involved with the bridge or signal source monitor and also with the servo monitor.

FIGURE 3 is an electrical schematic of the amplifier 101, FIGURE 1, and its associated elements. Gain of such amplifier during bridge monitoring is controlled by the bridge or signal source monitor. The amplifier is duplicated in each of signal channels K, L and M in FIGURE 1. While FIGURE 3 shows the amplifier in detail and also its associated input elements and output elements as in FIGURE 1, emphasis here will be made basically on details of the amplifier itself involved in gain change. Amplifier 101 is an AC type receiving AC input control signals and may correspond with amplifier 101 of the above Carson et al. application and utilizes transistor elements rather than vacuum tube elements in connection with amplification of the signal. The bridge monitoring or signal source monitoring arrangement of FIGURE 2 is associated with a feedback arrangement in the amplifier which is effected through transformer 220. The feedback arrangement has gain changing provisions whereby the gain may be increased to three halves of its normal output. The feedback arragement comprises the feedback transformer 220 having a primary winding 221 and a secondary winding 222. The feedback voltage on secondary winding 222 derived from the output of the amplifier 101 is fed back through conductor 225 and various impedance paths to the base member 224 of NPN transistor element 226. The gain of amplifier 101 is controlled by causing the feedback on conductor 225 to pass through a high impedance path or a low impedance path. This is achieved by selectively connecting a gain control conductor 228 to signal ground. This connection is effected through the bridge monitor to be described. When conductor 228 is connected to signal ground, diode 223 is biased as to be conducting, and the feedback path from conductor 225 is now through diode 223, resistor 231, resistor 232, conductor 233, to transistor base element 224.

However when the ground on conductor 228 is lifted, diode 223 is reversely biased and is at this time essentially a high impedance or open circuit so that the feedback path is now through conductor 225, resistor 230, conductor 233 to the transistor base element 224. Thus, with conductor 228 connected by the bridge monitor to ground whereby diode 223 is conducting there is a maximum feedback and consequently the amplifier has low gain, but when conductor 228 is lifted from ground and the diode 223 is nonconducting there is very little feedback and the amplifier has its highest gain. The gain is controlled by the structure in FIGURE 5 as will be shown.

The AC output of amplifier 101 is converted to DC by demodulator 240 and thence through a scheduled gain control 106, high pass network 108, and lag device 110 is supplied to a summer 91 which sums the output of lag device 110 with a lateral acceleration signal on conductor 121. The DC output from summer 91 appears on conductor 242 as a function of yaw rate $\dot{\psi}K$, which is the sum of the output of lag device 110 with a lateral acceleration signal on conductor 121. The output conductor 242 through the bridge monitor is associated with a signal ground relay connection, to be described, for disabling channel K.

Bridge monitor

Considering now the bridge signal monitor or signal source monitor shown broadly in FIGURE 2, which controls the channel amplifier gain increase and channel disabling circuit, we consider initially the portion thereof involved with the comparison of two of the normally similar three signals from the three channels or signal sources K, L, and M. In FIGURE 2 it is evident that summer device 152 is associated with an amplifier 191 and memory arrangement 193 in connection with the comparison of signal $\dot{\psi}K$ and $\dot{\psi}L$. Since a similar comparison is made of two signals shown at the top of FIGURE 2 involving AL and AR, a detailed description of amplifier 157 and memory 159 will suffice for each of the five arrangements in FIGURE 2 which compare the relative magnitudes of two signals.

Figure 4:
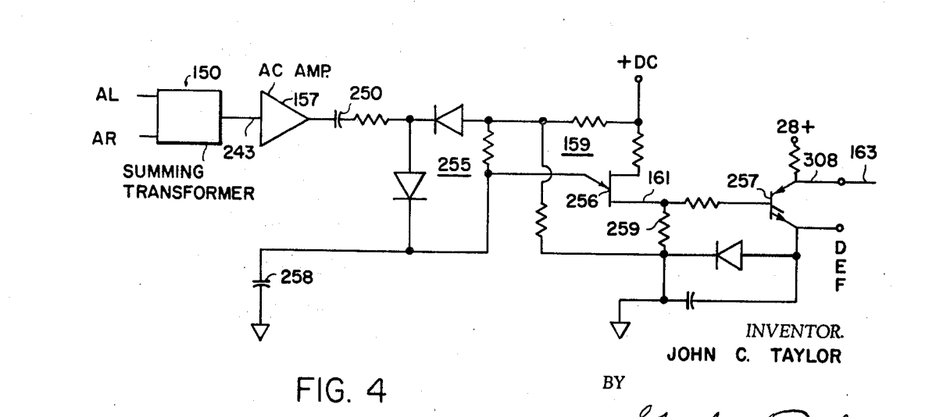
FIGURE 4 is an electrical schematic of a portion of the servo monitoring control or monitoring actuating means in FIGURE 2.

FIGURE 4 shows broadly a summing transformer for AR, AL and buffer amplifier 157 connected to a solid state memory 159, which have their counterparts in amplifiers 172, 191, 201, 211 and memories 174, 193, 203, 213. FIGURE 4 includes the function of AND logic 227 FIGURE 2. In FIGURE 4, a control signal to AC amplifier 157 is derived from the AL and AR servo-motor displacements. These AC servo displacement signals are supplied to summing transformer 150 and thence by conductor 243 to AC buffer amplifier 157. Amplifier 157 is preferably of a transistor type having two stages designed for class A operation.

The output of amplifier 157 is supplied through a coupling capacitor 250 to a fast gating bistable or flip-flop device 159. Such bistable device is often referred to as a memory device since it is not automatically reset upon removal of a control signal thereto.

The bistable device or memory 159 comprises a voltage doubler 255, a unijunction transistor 256, and silicon controlled rectifier 257. Resistor 259 provides a discharge path for capacitor 258 of doubler 255. In the overall system operation, with $AL+AR$ not zero, an AC electrical signal is applied through conductor 243 to amplifier 157. Its output is supplied through capacitor 250 to voltage doubler 255. It in turn causes unijunction transistor 256 to apply an output pulse to silicon controlled rectifier 257. Rectifier 257 remains conducting despite cessation of pulses and thus it is a bistable device. As is true of the other bistable devices 174, 193, 203, 213, it must be recycled to be restored to initial condition. Rectifier 257 as connected provides the function of OR logic 162, FIGURE 2. Briefly, in the normal operation, the memory 159 has an output or voltage at 308, FIGURE 4, to conductor 163 and when an output disappears, i.e. conductor 308 is connected to ground, the servo monitor or comparator will cause disengagement of say the AL and AR servomotors rendering them ineffective as will be clarified in FIGURE 6 to operate their respective main actuator controls.

It will be appreciated that while the flip-flop 159 operates from AC signals to its amplifier 157, modification thereof to operate from DC input signals from summers 152, 153, 154 if desired may be readily provided by changing the DC electrical signals to AC.

In a similar manner the respective AC linear amplifiers and memory devices used in the comparison of the eight other signals as shown in FIGURE 2 normally do not have an output when their input signals are balanced but do have an output causing conduction in their silicon control rectifiers when the two input signals are initially unlike in magnitude so as to provide an AC signal to their respective AC linear amplifiers.

Continuing to the logic and switching feature details of the bridge monitor or signal source monitor it is evident from FIGURE 2 that there are three outputs D, E, F on conductors 194, 204, and 214 respectively provided by signal comparators similar to FIGURE 4.

Figure 5:
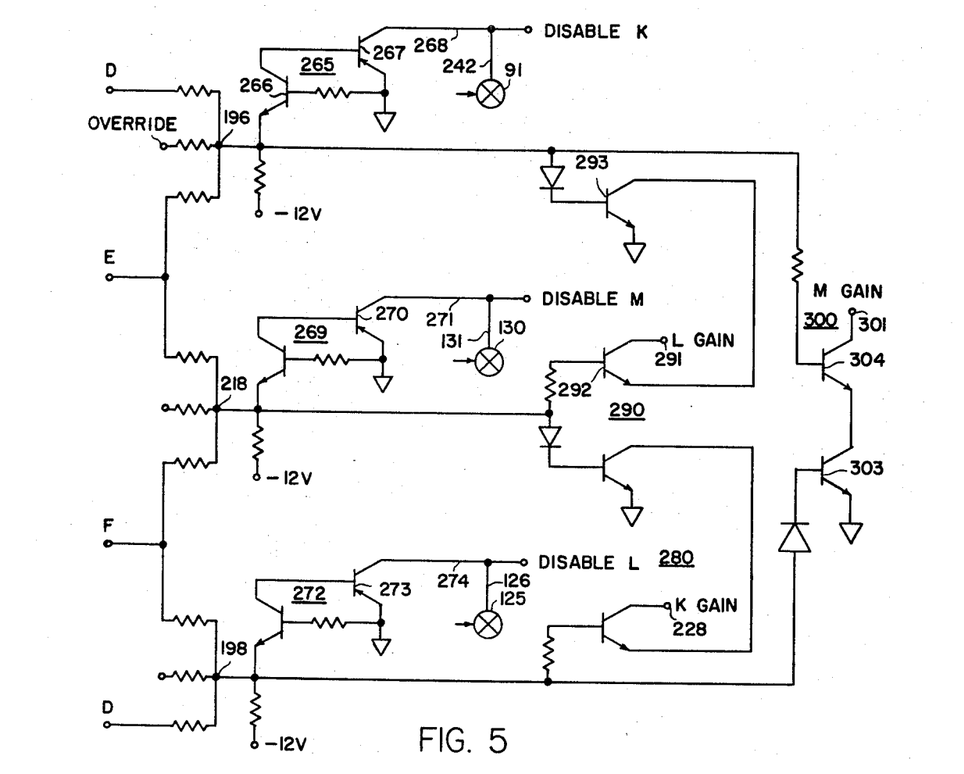
FIGURE 5 is an electrical schematic of a portion of the bridge signal monitor in FIGURE 2.
Figure 7:
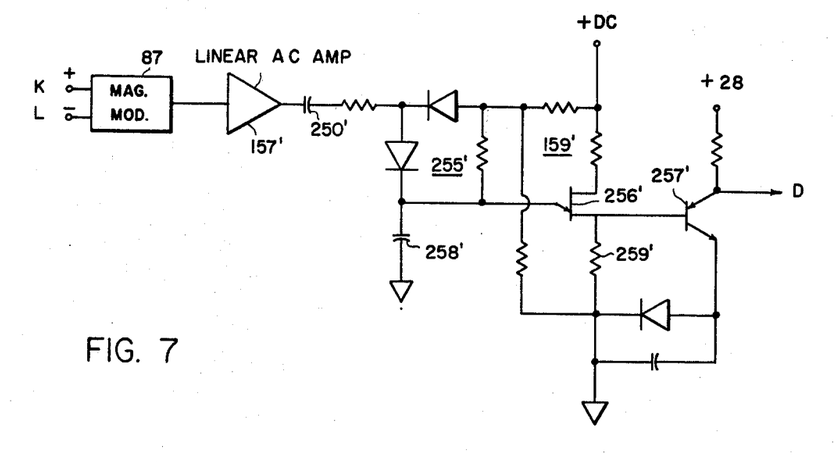
FIGURE 7 is similar to FIGURE 4 but pertains to the bridge monitor of FIGURE 5.

The above outputs D, E and F are separately provided by three arrangements one of which is shown in FIGURE 7 which corresponds generally with the arrangement of FIGURE 4. By referring to FIGURE 2, DC inputs K and L are supplied to a magnetic modulator 87 where they are converted to AC and the difference from the combined signals is an AC output supplying a linear AC amplifier 157' having its output supplied through a coupling capacitor 250' to voltage doubler 255'. The DC output from voltage doubler 255' in turn controls a unijunction transistor 256' having one base connected to a DC supply and its other base connected to signal ground. The arrangement is such that when the sum of signals K and L is not equal to zero a pulse is supplied to the emitter of unijunction transistor 256' which in turn operates the silicon controlled rectifier 257'. Rectifier 257' has one emitter connected through a resistor to a 28 volt supply and its other emitter connected to signal ground through a diode. When rectifier 257' is operated, it provides a low impedance path to signal ground and consequently the output conductor D is substantially at signal ground. This conductor D is also indicated in FIGURES 2 and 5. It is to be understood that an arrangement similar to FIGURE 7 is provided for comparison of in one instance quantities K and M and in another instance quantities L and M. Thus it will be understood that with K and L unlike, D in effect is connected to signal ground.

The switching logic controlled by these out-puts D, E and F are shown in elecrical detail in FIGURE 5. In FIGURE 5 the AND gates 196, 218 and 198 of FIGURE 2 are shown as of the resistor type. Thus the AND gate 196 receives inputs D and E; the AND gate 218 receives inputs E and F and AND gate 198 receives as inputs F and D. Continuing beyond the AND logics 196, 218, 198, the K channel has a disabling switch arrangement 265 having paired transistors 266, 267 connected through a conductor 268 to the logic device 87 on the output side of summer 91 in the K channel. Normally transistor 267 is off and is a high impedance, but when transistor 267 is on as determined by the output of the AND logic 196 the K channel bridge is connected to signal ground through transistor 267 and thus the signal source or K bridge is rendered ineffective to control the servomotors 50, 51, 60, 61. Similarly the resistor type AND logic 218 is associated with a switching arrangement 269 having its output conductor 271 extending from transistor 270 to the logic device 99 at the output side of summer 130 in the M bridge or M channel of FIGURE 1. Again conductor 271 connects the M bridge to signal ground upon conduction through transistor 270 thereby rendering the M bridge ineffective to control the servomotors. Also the output of AND logic 198 is applied to a switching arrangement 272 so that the output transistor 273 through its conductor 274 connected to logic device 86 at the output of summer 125 connects the L signal channel to ground thereby rendering it ineffective upon output from AND logic 198. Summarizing, if D and E are in effect connected to signal ground through their respective silicon controlled rectifiers, indicating channel K is at fault, at 196 FIGURE 5 the voltage is below signal ground. The base of transistor is positive relative to its emitter causing conduction making the collector of transistor 266 about the same voltage as the emitter. This in turn makes the base of transistor 267 negative with respect to the transistor emitter causing conduction through transistor 267 grounding the K signal bridge.

Thus far we have considered in the bridge monitor the switching means for disabling one of the three bridges in the case of a malfunction therein. Provisions for increasing the gain of the two remaining connected bridges or channels will now be explained.

For increasing the gain of amplifiers in the signal channels, corresponding with amplifier 101 of FIGURE 3 there is provided a switching arrangement 280 for channel K, a switching arrangement 290 for channel L, and a switching arrangement 300 for chanel M. There are three output conductors from these six switching means corresponding to conductors 281, 291, 301, corresponding with selective ground conductor 228 of FIGURE 3. As stated in connection with the description of FIGURE 3, when these conductors are connected to signal ground through their associated switching means, the gain of its respective amplifier is low, but when the conductor is lifted from ground the amplifier gain is increased and in this case equals substantially three halves of its normal gain when the conductor is connected to ground. Reviewing the above, it is apparent that with D and E connected to signal ground and due to the −12 volt bias, the base of transistor 293 being negative relative to the emitter thereof, transistor 293 is off and thus increasing the impedance path to ground of 291 from the L channel amplifier corresponding with 281 of the K channel amplifier, it will also be evident that with D different from F, and with F at 28 volts for a single failure as in the K channel 198 is plus relative to signal ground. The base of transistor 303 will be positive relative to its emitter. This will make its collector and the emitter of 304 signal ground potential. Consequently the base of 304 will be negative relative to its emitter and transistor 304 will be turned off to increase the impedance path in the M channel amplifier increasing its gain to three halves normal. However, if there is no output from AND logic 196, i.e. D and E are at 28 volt plus, the base of transistor 293 is positive relative to the emitter, and the tranistor 293 is on. Also with E and F at 28 volts plus, the emitter of 292 is now at signal ground. The base of transistor 292 positive with respect to its emitter thus turning transistor 292 on to provide normal gain in bridge L as described. I similarly provide normal gain in signal bridge M for no bridge K signal failure.

It will also be evident from the above, that when signal bridge L is disabled the gain of signal bridges K and M is increased at their respective amplifiers corresponding to amplifier 101, FIGURE 3, having gain connection 288. Further, if signal bridge M be disabled the gain in signal channels K and L is increased.

Figure 6:
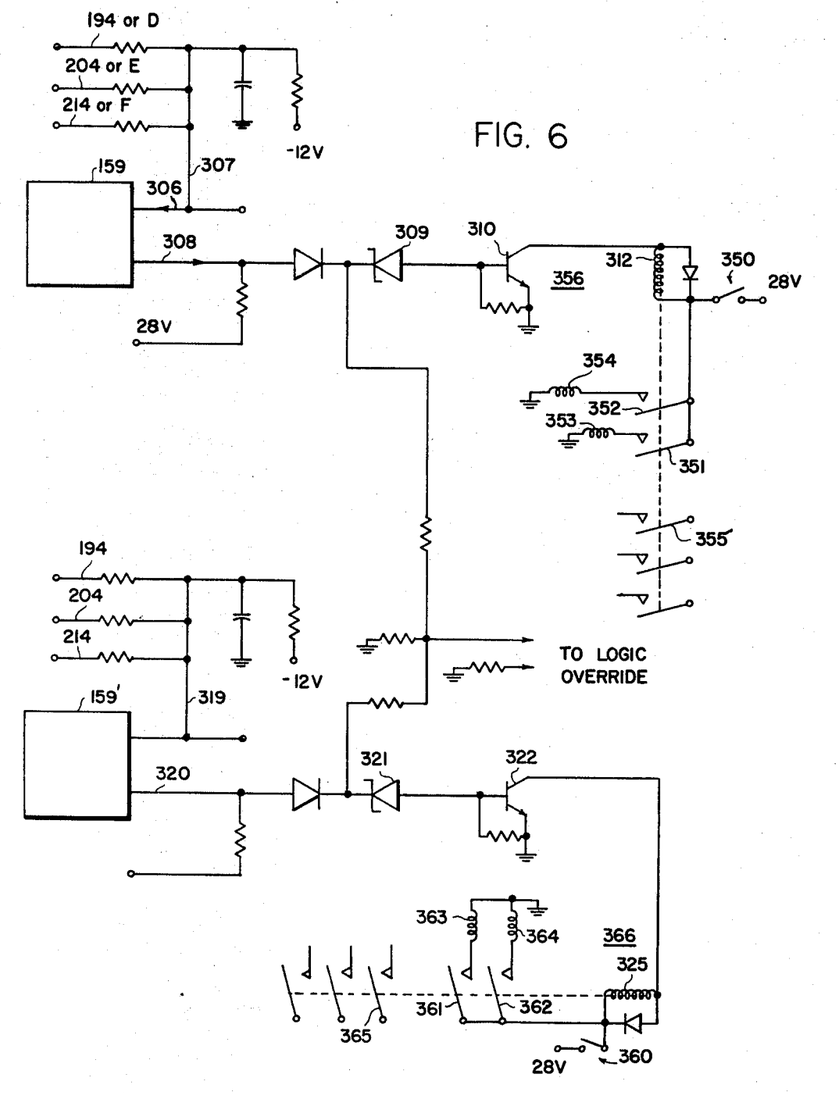
FIGURE 6 shows the servomotor engage circuitry for a plurality of fluid type servomotors for rendering them effective for operation as controlled from the bridge monitor and servo monitor.

The servomotor monitor and the cross connection thereto the bridge monitor is shown in FIGURES 4 and 6. It will be recalled that the AL and AR servomotors are to be rendered ineffective if there is a dissimilarity in the magnitudes of their feedback signals. Similarly the BL and BR servomotors are to be rendered ineffective if there is a dissimilarity in the magnitude of their feedback signals. In addition a cross connection from the bridge monitor to the servo monitor provides rendering both AL, AR and BL, BR servomotors ineffective upon a double failure in the sources of signals K, L, M. In other words, if any two of signal sources K, L, M is concurrently suffering a malfunction both pairs of servomotors are to be rendered ineffective.

In the event that only two servomotors such as AL, AR are rendered ineffective while there is no signal channel malfunction, the arrangement includes provisions that the gain to servos BL, BR for example be doubled. Such doubling in gain of the servomotors as to their operation is required in order that the left and right vertical actuators receive a similar operation as when both sets of servomotors are normally operating.

In FIGURE 6 there is shown the memory device 159 of FIGURE 4 having an output conductor 308 and an input conductor 306 receiving over conductor 307 the inputs from conductors 194, 204, 214 through summing resistors. The conductors represent the quantities D, E and F from FIGURE 2. The memory device 159 from FIGURE 4 has a second input resulting from the difference in displacements of servomotors AL and AR. Thus there will be an output on conductor 308 from memory 159 either from an input on conductor 307 or from any difference in operation of servos AL, AR. The output on conductor 308 is supplied through a Zener diode 309 to a switching device 310 of the transistor type. The transistor 310 which is of the NPN type controls the circuit through a relay winding 312 of switch 164 FIGURE 2 which winding 312 in similar to winding 291 Figure 5 of the prior Carson et al. application. Thus, if $AL+AR$ is not equal to zero, for example, briefly 256 is turned on, 257 is tuned on causing a voltage drop on conductor 308 connected to the DC supply. In fact conductor 308 goes substantially to ground thus cutting off conduction through 310 which now acts as a high impedance which in effect stops current flow through relay winding 312 to disengage the A servos.

The circuit through winding 312 is also controlled with transistor 310 conducting through a manually operable switch 350 connected to a 28 volt supply. The energization of winding 312 operates relay arms 351, 352 to close circuits through servo engage valve windings 353, 354 whereby the AR and AL servomotors are rendered effective for subsequent operation by their control valves. Such type of solenoid operated engage valve is old in Rasmussen Figure 3 above wherein winding 344 corresponds with duplicate windings 353, 354.

It is to be unerstood that a similar monitor for rendering ineffective the BR and BL servomotors is provided. This is represented in FIGURE 6 by showing of a memory device 159' which is controlled by either the difference in operation of servomotors BL, BR on the one hand and the inputs over conductors 194, 204, 214 of FIGURE 2. The outputs from memory device 159' on conductor 320 is supplied through a Zener diode 321 to a transistor switching arrangement 322. The switching arrangement 322 controls the circuit through a winding 325 of an engage relay in switch 181, FIGURE 2, following operation of a manual switch 360 corresponding to that in the AR, AL servo engage circuitry above.

While thus far in the servomotor monitor, an arrangement has been described for rendering either set of servomotors AR, AL or BR, BL ineffective upon a difference in operation of either pair of servomotors and have also shown that upon an input on conductors 307, 319 to memory devices 159, 159' both sets AL, AR BR, BL are rendered ineffective, further means as stated are provided for increasing the gain of one set of servomotors with no signal channel malfunction if the other set of servomotors have alone been rendered ineffective to operate the actuators.

This arrangement is broadly shown in FIGURE 1 by a switching arrangement 370 associated with the conductor 118 to the right of summer 91; by the switching arrangement 375 for the output on conductor 131 in the M channel, and by a switching arrangement 380 for the L channel downstream from conductor 126. Such switching is provided by the relay 356, FIGURE 6, for controlling the disengagement of servos AL, AR. The relay has five operable arms. The upper two 351 and 352, as stated, control the energization of the windings 353, 354 of the engage valves for the AR and AL servomotors. A second relay 366 similarly has five operable arms the upper arms 361, 362 being associated with engage valve operating windings 363, 364 for the BR and BL servomotors. When the circuit to the valve operating windings 353, 354, 363, 364 is interrupted, centering means in the fluid type servomotors center the main power ram and hold it in such centered position.

Relay 356 and relay 366 include three remaining operable arms comprising arms 355, 365. Relay arm 355 of relay 356 and relay arm 365 of relay 366 are associated in say the K signal channel as shown in FIGURE 3.

Assuming that parallel electrical summing which is old in the art is utilized in combining the electrical control signals of channels K, L and M, gain doubling may be effected as shown in FIGURE 3 for example by providing a resistor 384 and relay contact 355, 365 to ground, when the both sets of servomotors are normally engaged. In such situation, the output conductor 242 of summer 91, FIGURE 3, provides a control signal having say a unit value of gain which is combined with the signals from channels L and M also having say a unit gain value. However, upon a servo failure occurring as to AR, AL or BR, BL either relay arm 355, 365 is dropped to the lower position shown in FIGURE 3 opening the circuit from conductor 242 to signal ground. This in effect doubles the gain of the signal from conductor 242 which is combined with the signal from channels L and M. A similar gain doubling arrangement is also provided for the circuits in the L and M channel corresponding with FIGURE 3 by utilization of the remaining two unused relay arms of relays 356, 366.

It will now be evident that there has been provided a novel improved reliability arrangement for a yaw stabilization system for an aircraft wherein two pairs of servomotors are controlled by three similar sources of control signals in such manner that both pairs of servomotors are controlled by the summation of the signals of the three signal sources, and that upon a single failure in one signal source the gain of the two functioning signal sources is increased by three halves to maintain normal operation of the two pairs of servomotors, and wherein upon the presence of a double malfunctioning in the signal sources both sets of servomotors are rendered ineffective to control the positioning of a control surface of an aircraft. Further, that a novel servo monitoring arrangement has been provided wherein upon disagreement between the displacements of two servomotors constituting a single pair of two servomotors the malfunctioning pair of servomotors is rendered ineffective to operate a control surface of an aircraft and the control signal to the remaining pair of servomotors is doubled to provide normal operation of the control surfaces of the craft.

While but one embodiment of the invention has been illustrated and described in detail, it is to be understood that the invention is not limited to such precise details and that various changes can be made in the design and arrangement of the parts without departing from the spirit and scope of the invention except as limited by the following claims.

What is claimed is:

1. In control apparatus for an aircraft having a plurality of similar control surfaces each having a separate servomotor means operating it: a first, second and third source of motor control signals; means operated by each signal source for operating each servomotor means whereby each servomotor means is controlled by all signal sources; monitoring means connected to receive signals from all signal sources comparing the magnitudes of the plurality of signals from all signal sources; and means controlled by the monitoring means upon the determination of an unlike signal from one signal source, or single signal failure, among the plurality of signals, reducing the control effect of such signal source on said servomotor means.

2. The apparatus of claim 1, and further means controlled by said monitoring means increasing the control effect of at least one other signal source on said serrvomotor means to substantially maintain the same operation of all servomotor means from a lesser number of signal sources.

3. In a followup system having a plurality of servomotors each in its own followup system whereby its displacement is in accordance with the magnitude of a control signal: a plurality of sources of like signals; means jointly operated by all sources of signals supplying a resultant control signal to each servomotor whereby each servomotor is controlled by all signal sources; signal source monitoring means connected to receive signals from all sources comparing the signals from the plurality of signal sources; and means operated by the monitoring means upon determination of an unlike signal from a signal source among the plurality of signals rendering only such signal source ineffective to control said servomotors.

4. In a motor control system having a plurality of servomotors each operating a control member having a similar control effect on a condition, means for increasing reliability of operation of the motors comprising: a plurality of sources of normally like control signals; means jointly operated by each signal source supplying a control signal to each servomotor whereby each motor is controlled by all signal sources; monitoring means connected to receive signals from said signal sources comparing the signals from all signal sources in at least one set of three pairs; and means operated by the monitoring means upon determination of an unlike signal from say one signal source among the plurality of signals, reducing the control effect of such signal source on said servomotors.

5. The apparatus of claim 4 and further means controlled by the monitoring means and effective upon a discrepancy in the signal from two signal sources rendering all servomotors ineffective to position condition controlling means.

6. In control apparatus for an aircraft having a plurality of similar control surfaces each having a separate servomotor means operating it: a plurality of sources of servomotor means operation initiating electrical control signals; means operated by each signal source operating each servomotor means whereby each motor means is controlled by all electrical control signal sources; monitoring means connected to receive signals from all sources comparing the electrical signals from all signal sources; and means controlled by the monitoring means upon the determination of an unlike electrical signal from one electrical signal source among the plurality of electrical signals, reducing the control effect of such electrical signal source to control such servomotors.

7. The apparatus of claim 6 and circuit maintaining means in said monitoring means for maintaining one electrical signal source at a reduced effect on said servomotor means despite subsequent similarities in said electrical signals.

8. The apparatus of claim 1, and means in said monitoring means effective on a double signal failure concurrently, rendering the servomotor means ineffective to position the control surfaces.

9. In control apparatus having a plurality of servomotors for operating a controlled member: a plurality of electrical signal sources; means operated jointly by all signal sources supplying a control signal to each servomotor whereby each motor is controlled by all signal sources; monitoring means comparing the signals from all signal sources; and means controlled by the monitoring means upon a discrepancy existing in one less than the plurality of signals thereby indicating a discrepancy in the one less than the plurality of signal sources rendering all servomotors ineffective simultaneously to operate the member.

10. The apparatus of claim 9 and monitoring means effective upon a discrepancy in but one signal from the other plurality of signals rendering such signal source ineffective to control said servomotors.

11. In control apparatus having a servomotor means operating a controlled member: means for increasing the reliability of operation of the servomotor means comprising a plurality of electrical signal sources each responsive to a similar condition controlled by operation of said member providing an electrical signal in accordance with the magnitude of change in the condition; means for controlling said servomotor means from all of said electrical signal sources; signal monitoring means connected to the plurality of signal sources for receiving and comparing the plurality of electrical signals from all signal sources; and means controlled by the monitoring means upon the determination of a discrepancy in one electrical signal from the other plurality of electrical signals reducing the control effect of the one signal source to control said servomotor means.

12. The apparatus of claim 11; and further means controlled by the monitoring means increasing the gain of other signal sources whereby operation of the servomotor means is substantially the same, following reduction in control effect of said one signal source as prior thereto.

13. The apparatus of claim 11 and additional means in said monitoring means maintaining the reduction in control effect of said one signal source despite subsequent agreement of the one signal source with the remaining plurality of signal sources.

14. The apparatus of claim 11 and a second servomotor means responsive to all said signal sources that are effective.

15. The apparatus of claim 14 and servo monitoring means controlled by the first monitoring means and rendering both servomotor means ineffective on said control member upon a discrepancy in the magnitude of the signal from two signal sources as determined by the monitoring means.

16. In control apparatus, in combination: three sources of normally like control signals; means for combining said three signals to provide a resultant signal; monitoring means receiving said three signals and comparing pairs of signals having a common quantity, derived from said three signals for identifying an unlike signal, means connected to the monitoring means and effective on the presence of an unlike signal for rendering the unlike signal ineffective on said resultant signal and further means controlled by the monitor means and connected to the three signal sources and substantially retaining the magnitude of said resultant signal by increasing the proportions of said two like signals on said resultant signal.

17. The apparatus of claim 16, wherein said monitoring means includes bi-stable devices for retaining said unlike signal ineffective on said resultant signal despite subsequent changes therein causing the attainment of equality thereof with said other two signals.

18. The apparatus of claim 16, and servo means operated by said resultant signal.

19. The apparatus of claim 18, and means operated by the monitoring means for rendering said servo means ineffective on existence of an inequality or unlike relation between the two remaining signals.

References Cited

UNITED STATES PATENTS

| 3,054,039 | 9/1962 | Meredith | 318—20.075 |
| 3,070,071 | 12/1962 | Cooper | 318—20.075 |
| 3,100,861 | 8/1963 | Osder | 318—20.080 |
| 3,145,330 | 8/1964 | Hecht | 318—20.075 |
| 3,190,586 | 6/1965 | Righton | 244—77 |

FOREIGN PATENTS

| 882,334 | 11/1961 | Great Britain. |

FERGUS S. MIDDLETON, *Primary Examiner.*